(12) United States Patent
Vergoossen

(10) Patent No.: US 8,054,845 B2
(45) Date of Patent: Nov. 8, 2011

(54) DECOUPLED CONNECTIONS

(75) Inventor: Theodorus Anna Peter Gertrudis Vergoossen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 169 days.

(21) Appl. No.: 12/377,695

(22) PCT Filed: Aug. 14, 2007

(86) PCT No.: PCT/IB2007/053223
§ 371 (c)(1),
(2), (4) Date: Feb. 17, 2009

(87) PCT Pub. No.: WO2008/020401
PCT Pub. Date: Feb. 21, 2008

(65) Prior Publication Data
US 2010/0194996 A1 Aug. 5, 2010

(30) Foreign Application Priority Data
Aug. 18, 2006 (EP) ..................................... 06119140

(51) Int. Cl.
*H04L 12/56* (2006.01)
*H04L 12/66* (2006.01)
*G06F 15/163* (2006.01)

(52) U.S. Cl. ........ 370/401; 370/463; 370/252; 709/224; 709/226

(58) Field of Classification Search ............... 370/252, 370/254, 255, 392, 400, 401, 463; 709/220–225
See application file for complete search history.

(56) References Cited

U.S. PATENT DOCUMENTS

| | | | |
|---|---|---|---|
| 6,691,165 B1 * | 2/2004 | Bruck et al. | 709/227 |
| 6,975,647 B2 * | 12/2005 | Neale et al. | 370/466 |
| 7,117,267 B2 * | 10/2006 | Bavadekar | 709/230 |
| 7,529,256 B2 * | 5/2009 | Pathan | 370/401 |
| 7,587,518 B2 * | 9/2009 | Bahl | 709/226 |
| 7,698,463 B2 * | 4/2010 | Ogier et al. | 709/242 |
| 2002/0019761 A1 | 2/2002 | Lidow | |
| 2003/0223377 A1 | 12/2003 | Simmons et al. | |
| 2004/0143847 A1 | 7/2004 | Suzuki et al. | |
| 2004/0184431 A1 | 9/2004 | Park | |
| 2005/0122921 A1 | 6/2005 | Seo | |

(Continued)

FOREIGN PATENT DOCUMENTS
EP 1496669 A1 1/2005
(Continued)

*Primary Examiner* — Aung S Moe
*Assistant Examiner* — Kerri Rose
(74) *Attorney, Agent, or Firm* — Larry Liberchuk

(57) ABSTRACT

Methods and nodes are provided herein that can generate reliable acknowledgements within the time-frame required to transmit a single message over a decoupled connection so as to meet the real-time requirements of the CEC protocol. Specifically, there is provided a method in a communication system, the communication system comprising a first device, a second device, a first node and a second node, the first and second nodes being connected via a decoupled connection, the method comprising sending a plurality of data packets from the first device to the second device via the first and second nodes; on receiving a data packet from the first device, providing an acknowledgement for said data packet from the first node to the first device; wherein the acknowledgement provided to the first device corresponds to an acknowledgement provided to the first node from the second device in respect of a data packet preceding said data packet.

14 Claims, 3 Drawing Sheets

U.S. PATENT DOCUMENTS

| | | |
|---|---|---|
| 2005/0223411 A1 | 10/2005 | Jung et al. |
| 2006/0026296 A1* | 2/2006 | Nagaraj .................. 709/233 |
| 2006/0095638 A1 | 5/2006 | Unger |
| 2006/0120297 A1 | 6/2006 | Hamedi et al. |
| 2006/0271642 A1* | 11/2006 | Stavrakos et al. ............. 709/217 |

FOREIGN PATENT DOCUMENTS

| | | |
|---|---|---|
| WO | 2005114909 A1 | 12/2005 |

* cited by examiner

DECOUPLED CONNECTIONS

TECHNICAL FIELD OF THE INVENTION

The invention relates to a decoupled connection in an otherwise coupled connection between a plurality of devices, and in particular relates to methods and nodes for resolving addresses of devices and for acknowledging messages sent across the decoupled connection.

BACKGROUND TO THE INVENTION

The High-Definition Multimedia Interface (HDMI) is an uncompressed, all-digital audio/video interface. HDMI provides an interface between any compatible digital AV source, such as a set-top box, a DVD player, or an A/V receiver and a compatible digital audio and/or video monitor, such as a digital television.

Further developments of the HDMI standard are being made, in particular for providing wireless HDMI connections and also optical HDMI connections. In a conventional system, a number of devices are interconnected by physical HDMI leads, and write and read back operations occur over the connection without delay. However, when a wireless or optical connection is used, the physical wires effectively become 'decoupled', which means that there is a delay between a write operation on the transmit side and a read back operation as a result of the write operation.

This is not a problem for the transmission of audio and/or video data over a HDMI connection, as this transmission is unidirectional and does not require fast feedback from the destination to the source. In some cases, feedback may not be required at all. It is also not a problem for the transmission of $I^2C$ data, as although acknowledgement on every single byte is required, some delay can be tolerated by only reporting the acknowledgement of the recipient for the last byte of the transmission. In addition, the $I^2C$ bus has means for flow control via the so-called clock stretching.

However, the delay caused by decoupled connections is a problem for the transmission of Consumer Electronics Control (CEC) data. CEC is an optional protocol in a HDMI system which allows HDMI devices to pass on control functions to all or other devices in the system. These control functions can be originated by a remote control for one of the devices in the system, and can include one-touch play, system standby, one-touch record, timer programming, OSD and device menu control functions.

Although CEC data is transmitted at a relatively low bit rate, this protocol can use single byte messages, and feedback from the receiver is required effectively instantaneously after the last bit is transmitted. In addition, the CEC protocol does not have any flow control, and having different timing intervals between consecutive messages for new data and retry data increases the complexity.

If the CEC data is forwarded by a decoupled connection, it is necessary to wait for the returned acknowledgement, which means that the real-time requirements of the ack/nack message cannot be met. If the complete message was captured at the transmitter, forwarded to the receiver via the decoupled connection, and reproduced at the receiver, the message interaction between the transmitter and receiver will be affected and the real-time behaviour of the complete system will be changed.

Currently, single byte CEC messages are used for a logical address resolution protocol. The address resolution protocol relies on receiving proper acknowledgements, and unique addresses for devices are required for the active devices.

SUMMARY OF THE INVENTION

It is an object of the invention to provide methods and nodes that can generate reliable acknowledgements within the time-frame required to transmit a single message over a decoupled connection so as to meet the real-time requirements of the CEC protocol.

In accordance with a first aspect of the invention, there is provided a method of building a data structure in a first node, the first node being suitable for connection to a second node via a decoupled connection, a first set of devices being connected to the first node via a coupled connection, the method in the first node comprising scanning a plurality of addresses at the first node to determine if any devices in the first set of devices are associated with any of said addresses; and storing the result of the scanning step as a first data structure.

In accordance with a second aspect of the invention, there is provided a method of operating a first node, the first node being connected to at least a first device via a coupled connection, the first node being suitable for connection to a second node via a decoupled connection, the method in the first node comprising receiving a data structure from the second node via the decoupled connection, the data structure indicating whether any of a plurality of addresses have devices associated therewith; receiving a message for a second device from the first device; examining the data structure to determine whether said second device is a device that is associated with an address; if said second device is not a device that is associated with an address, providing a negative acknowledgement to the first device.

In accordance with a third aspect of the invention, there is provided a node suitable for connection to other nodes via a decoupled connection, the node comprising means for performing the steps in either of the methods described above.

These aspects of the invention allow address resolution messages in a timing-critical network to work correctly when there is a decoupled connection between two or more connected devices. As a result, the decoupled connection acts in a transparent way, for example in the same way as copper wire. This method reduces the chances of duplicate addresses being allocated to the devices.

In accordance with a fourth aspect of the invention, there is provided a method in a communication system, the communication system comprising a first device, a second device, a first node and a second node, the first and second nodes being connected via a decoupled connection, the method comprising sending a plurality of data packets from the first device to the second device via the first and second nodes; on receiving a data packet from the first device, providing an acknowledgement for said data packet from the first node to the first device; wherein the acknowledgement provided to the first device corresponds to an acknowledgement provided to the first node from the second device in respect of a data packet preceding said data packet.

In accordance with a fifth aspect of the invention, there is provided a node, comprising means for receiving a plurality of data packets from a first device; means for sending the plurality of data packets to a second node via a decoupled connection, the second node further transmitting the plurality of data packets to a second device; means for receiving an acknowledgement for each data packets in the plurality from the second device via the second node; means for providing an acknowledgement to the first device in response to receiving a data packet from the first device; wherein the acknowledgement provided to the first device corresponds to the acknowledgement received from the second device in respect of a data packet preceding said data packet.

The aspect of the invention allows message acknowledgement in a timing-critical network to work correctly when there is a decoupled connection between two or more connected devices. As a result, the decoupled connection acts in a transparent way, for example in the same way as copper wire. No difference in message sequencing and message order between devices should be observed as a result of using this method.

These and other aspects of the invention will be apparent from and elucidated with reference to the embodiments described hereinafter.

BRIEF DESCRIPTION OF THE DRAWINGS

The invention will now be described, by way of example only, with reference to the following drawings, in which.

DETAILED DESCRIPTION OF THE PREFERRED EMBODIMENTS

Although the invention will be described below with reference to the CEC protocol as used in an audio-visual system connected at least in part in accordance with the HDMI specification, it will be appreciated that that the invention is applicable to any type of system in which data is to be transmitted over a decoupled connection and in which a delay between a write operation on the transmit side and a read back operation as a result of the write operation will impact on the successful operation of the system.

In the following, it will be understood that a decoupled connection is a connection which results in a delay between a write operation on the transmit side and a read back operation as a result of the write operation that is significant in comparison to the delay that results from the same operation over a coupled connection, and which affects the operation or effectiveness of a data transmission protocol using the decoupled connection. In the exemplary embodiments described below, a coupled connection is a wired connection, and the decoupled connection can be either a wireless connection or an optical connection. Although a connection can be 'decoupled', it will be appreciated that it is still possible for this connection to be a physical connection between two nodes, for example in the case of optical fibers being used. It will also be appreciated by a person skilled in the art that other types of decoupled connection can be used in accordance with the invention.

Figure 1:
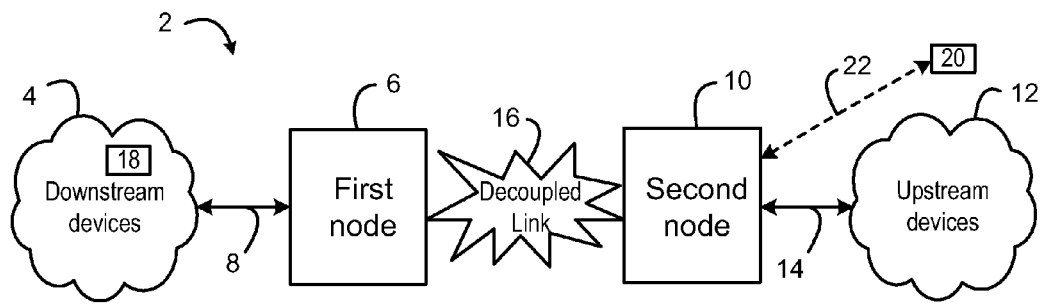
FIG. 1 is a block diagram of a system in accordance with the invention.

FIG. 1 shows an audio-visual system 2 in accordance with the invention. In the system 2, a first set of devices 4 are connected to a first node 6 via a coupled connection 8. The first set of devices 4 may comprise one or more devices, and the device or devices can comprise, for example, one or more of a set-top box, a DVD player, an A/V receiver, a compatible digital audio and/or video monitor, such as a digital television, or any other type of compatible digital AV source.

Furthermore, a second node 10 is provided which is connected to a second set of devices 12 via a coupled connection 14. The second set of devices 12 may comprise one or more devices, and can again include, for example, one or more of a set-top box, a DVD player, an A/V receiver, a compatible digital audio and/or video monitor, such as a digital television, or any other type of compatible digital AV source.

In a CEC configuration, it is only permitted to have a single registered display device, such as a digital television. If there are several display devices in the configuration, then only the first display device to perform address allocation will be allocated an address. The other display devices will not be able to allocate valid logical addresses. Similar restrictions apply to other types of audio-visual devices, such as DVD players, although in these cases, there might be more than one address available for devices of a particular type.

The first node 6 and the second node 10 are connected to each other via a decoupled connection 16. As described above, this decoupled connection can be a wireless connection or an optical connection.

The types and numbers of devices in each of the first and second sets of devices 4, 12 will depend on the particular system and the requirements of the user of the system. In many cases, the first set of devices 4 in an audio-visual system 2 could comprise audio-visual sources for the system 2, while the second set of devices 12 could comprise a visual display and/or audio outputs, such as speakers. In this case, a decoupled connection allows the display and speakers to be located away from the AV sources, such as on a wall, without having a large number of physical wires or leads trailing from the sources to the display and/or speakers.

It should be noted that although the nodes 6, 10 are illustrated as being separate components to the device or devices in the sets 4, 12, it is possible for a device and a node to be integrally formed. In addition, although only two nodes are shown in FIG. 1, it will be appreciated that a system could comprise more than two nodes, with each of the nodes communicating with each of the other nodes via a decoupled connection.

Preferably, the devices in the first and second sets of devices 4, 12 are connected to respective data buses or switches (not shown) using coupled connections, and these data buses can be connected to respective nodes 6, 10 via respective coupled connections 8 and 14. Each of the data buses or switches can have a number of physical input ports, such as HDMI ports, whilst the node can have a single physical input port for connection to the data bus. Alternatively, the node can be integrally formed with the data bus, which means that each of the nodes 6, 10 can have a number of physical input ports for connection to respective devices in the first and second sets of devices 4, 12. Therefore, each device is connected directly to its respective node 6, 10. As described above, these connections are coupled connections.

Devices that are connected into a system using HDMI can be allocated one of a plurality of possible addresses. According to the CEC protocol, there are sixteen possible logical addresses, with certain logical addresses usually being assigned to specific types of devices. For example, a display will usually be allocated address 0, while a DVD player will usually be allocated address 4. Each of the first and second nodes 6, 10 has a respective physical address for each input port in the node or bus respectively. The first and second nodes 6, 10 each have a respective associated logical address. As described, each device may also have a logical address, which is either predetermined and allocated to the device, or determined by the device when the device is activated.

At any time, each of the devices in the first and second sets of devices 4, 12 can be active or inactive. The devices can be activated or deactivated by a user, depending on how the system 2 is to be used. For example, if the user wants to watch a television broadcast, the visual display and set-top box will be activated. The other devices may be deactivated by operating a power button, or by disconnecting the device from a power supply. Alternatively, the other devices may remain active (including being placed in a standby mode), but the display device may be operated to select the data from the set-top box for display. Such operation and functionality is well-known in the art, and will not be described further herein.

Figure 2:
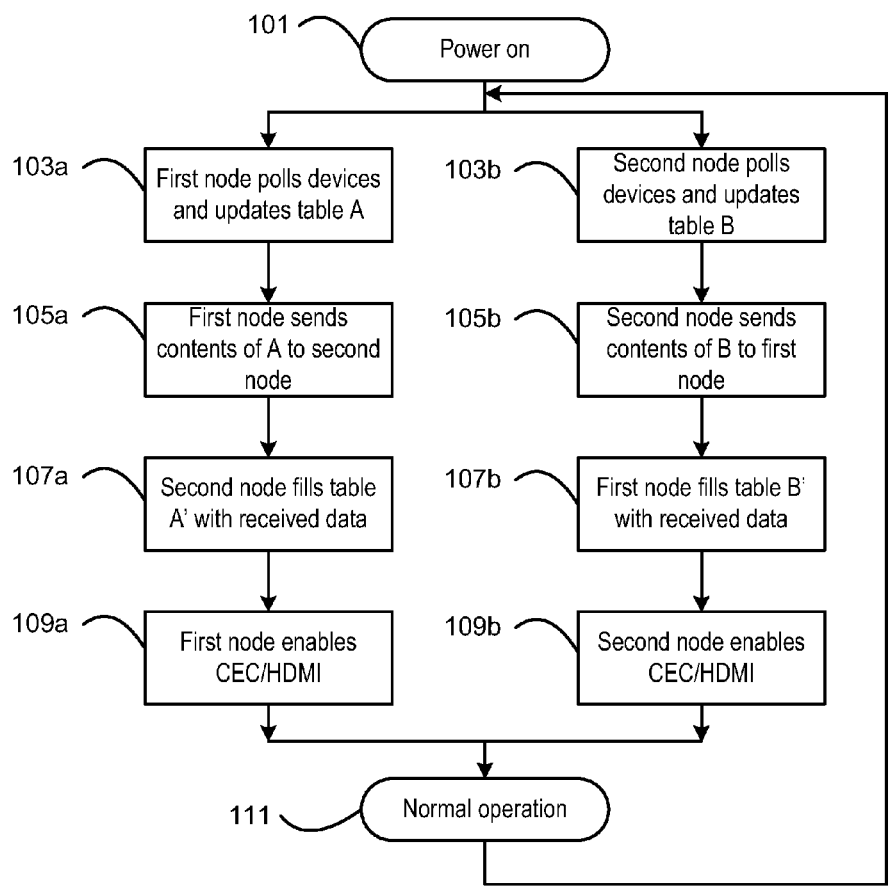
FIG. 2 is a flow chart illustrating the steps in a method in accordance with a first aspect of the invention.

In accordance with one aspect of the invention, each of the first and second nodes generates a respective list or data structure, such as a table, which indicates whether any devices connected thereto are active, i.e. the device is connected to a node and is available on the CEC bus. The generation and use of these data structures or tables as described below allows the problems with the real-time requirements of logical address resolution in the CEC protocol to be overcome. FIG. 2 illustrates a method of building a table in the first node 6 and second node 10 in accordance with the invention.

In step 101 of FIG. 2, the first node 6 and the second node 10 are activated, i.e. power is supplied to the first and second nodes 6, 10.

In step 103a, the first node 6 polls or scans its input port, which is preferably a CEC port, and specifically each of the possible logical addresses to determine if any active devices are attached to the node 6. Alternatively, the first node 6 may poll its respective data bus for active devices connected to the data bus. This scanning or polling can comprise selecting one of the possible logical addresses and sending a message, such as a single byte message, with the source and destination address for the message corresponding to the selected logical address. If an acknowledgement for the message is received, the logical address is in use. This process repeats for each of the possible logical addresses.

The results of the polling step are stored in a table in the first node 6, which is designated Table A. This Table A can contain an entry for each of the logical addresses polled by the first node 6, with an indication of which, if any, active device in the first set of devices 4 is associated with that logical address. Alternatively, if a logical address does not have an associated active device, Table A may not contain an entry for that address. In a further embodiment of the invention, the table may contain a physical address of any active device associated with a logical address, in addition to the relevant logical address.

In step 103b, the second node 10 polls or scans its input port, which is again preferably a CEC port, and specifically each of the logical addresses to determine if any active devices are attached to the node 10, or alternatively polls its respective data bus for active devices connected to the data bus, in the same way as the first node 6 in step 103a.

The results of the polling step are stored in a data structure, such as a table, in the second node 10, which is designated Table B. This Table B can contain an entry for each of the addresses polled by the second node 10, with an indication of which, if any, active device in the second set of devices 12 is associated with that address. Alternatively, if an address does not have an associated active device, Table B may not contain an entry for that address.

In steps 105a and 105b, the first node 6 transmits the contents of Table A to the second node 10 and the second node 10 transmits the contents of Table B to the first node 6 respectively. Both of these transmissions occur over the decoupled connection 16.

On reception of the contents of Tables A and B, the first node 6 and second node 10 store the received tables as Table B' and Table A' respectively, in addition to their original tables A and B (steps 107a and 107b). Alternatively, as the nodes 6, 10 poll the same list of addresses, the respective stored and received tables can be combined into a single data structure or table in each node.

In a preferred embodiment of the invention, on successful receipt of the table from the other node, the first and/or second nodes 6, 10 enable the operation of the data link between the devices in the first set 4 and the devices in the second set 12 (steps 109a and steps 109b). That is, until the nodes receive the copy of the table from the other node, the connection between the devices is disabled, i.e. no CEC messages are transmitted between the nodes, and no acknowledgement messages (whether positive or negative) are generated by the nodes. So-called address reports are sent out by a device when it allocates successfully a logical address. These address reports may advantageously be used by the CEC switches that terminate the decoupled link, for building e.g. routing tables. Preferably, the address reports that were received by a node while the link was not yet active are regenerated at another node on the other side of the link and vice versa. This step may comprise enabling the complete connection between the devices (i.e. audio-visual data and CEC data in the case of a HDMI connection) or just a specific part of the connection between the devices (i.e. CEC data). The operation may be enabled by one or more of the nodes 6, 10 sending an acknowledgement to the other node 6, 10 indicating that the respective table has been successfully received. In alternative embodiment of the invention, the data link or part of the data link not including the CEC link between the devices can be activated prior to the tables being successfully received by the other node.

In step 111, the nodes 6, 10 operate to transmit data, such as audio-visual and other data, between the devices as described in the HDMI specification.

As any of the devices in the first and second set of devices 4, 12 can be activated and/or deactivated while the decoupled connection 16 between the first node 6 and second node 10 is active, it is necessary to ensure that the respective tables A and B are current and up to date.

As the CEC protocol does not use any deregister operations, the nodes 6, 10 must each periodically poll the logical addresses in order to update their respective tables, to ensure that devices are added to or removed from their tables when they are activated or deactivated. In a preferred embodiment, this periodic polling occurs as often as possible, as devices can be activated or deactivated at any time. This is shown in FIG. 2 as the process loops back to steps 103a and 103b after step 111, where the polling steps are repeated. The updated tables are again sent to the other node, so each node has an up to date copy of the table in the other node.

When devices are activated, they preferably allocate themselves a logical address, and are required by the CEC protocol to send a report to the network indicating its logical and physical addresses. Therefore, this information can be received by the node that the device is connected to, and can be used for updating the table of that node.

By generating or building these data structures which indicate the addresses that are in use, the problem associated with devices being connected to different nodes and being allocated the same logical address can be overcome. Specifically, when a node sends a copy of its data structure to the other node, it will be immediately apparent if two devices have been allocated the same address. In protocols other than the CEC protocol, action can then be taken by one or more of the nodes to instruct the relevant device or devices to reallocate themselves a logical address. In the CEC protocol, this mechanism is not available, and the only solution is to deactivate or switch off one of the conflicting devices. As a result, when using a system that uses the CEC protocol, it is best if the nodes are activated before any devices are activated or connected to the nodes, and/or if all devices of the same type (e.g. DVD players) are connected to the same node.

Figure 3:
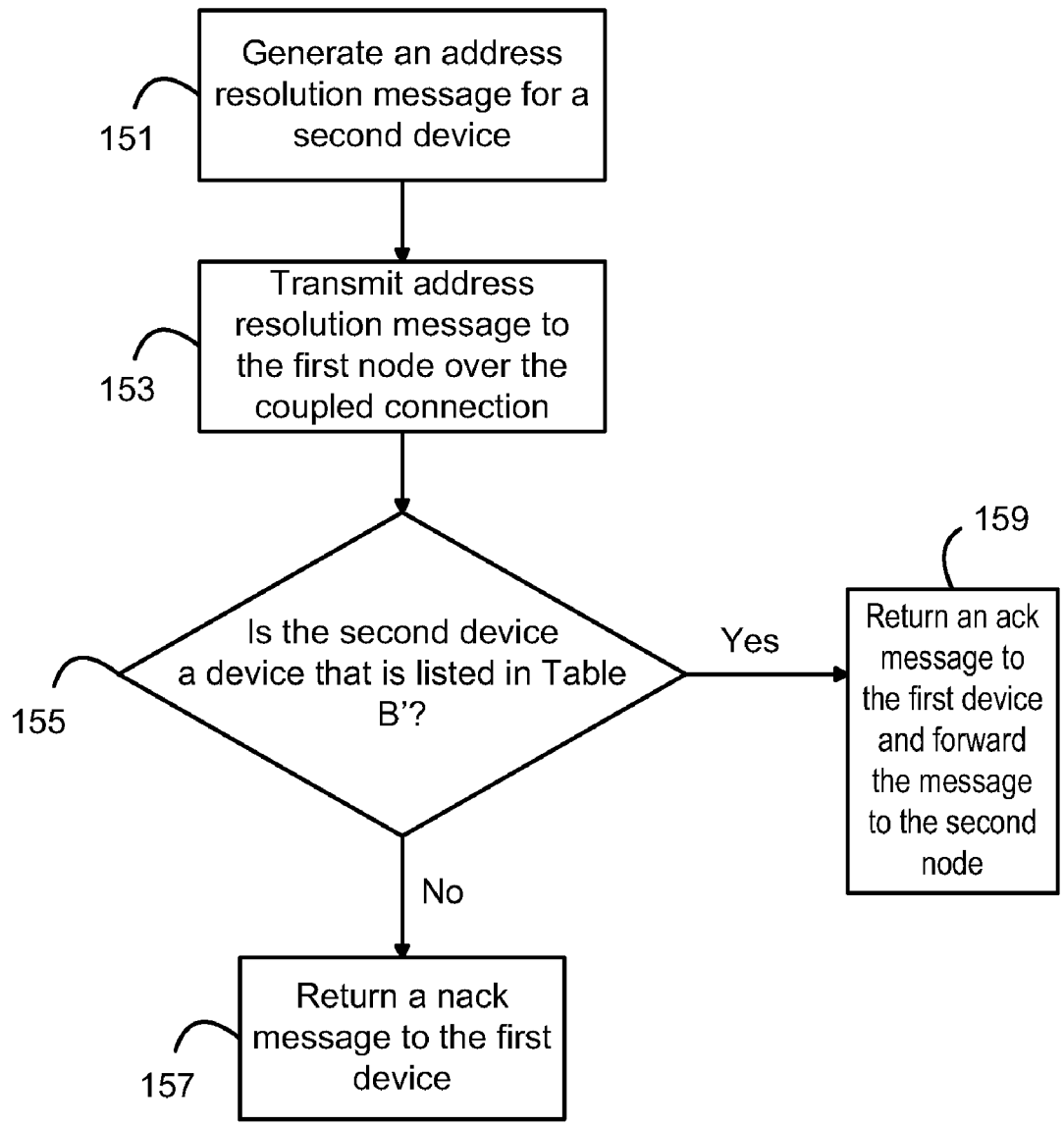
FIG. 3 is a flow chart illustrating the steps in a method in accordance with a second aspect of the invention.

As described above, the use of the tables and their respective copies in the other node allows the problems with the real-time requirements of logical address resolution in the CEC protocol to be overcome. Specifically, as illustrated in FIG. 3, an address resolution message, which is usually a single byte message, is generated by a first device in the first set of devices 4 for transmission to a second device 20 (step 151).

At this stage, it is not known whether the second device 20 is one of the devices that is in the second set of devices 12 (i.e. one of the devices that is connected to the second node 10 via the coupled connection 14), and if so, whether the device 20 is active or inactive. If the second device 20 is not one of the devices in the second set of devices, it could be that the second device 20 had previously been connected to the second node 10, and has now been physically disconnected. This uncertain connection is indicated as dotted arrow 22 in FIG. 1.

In step 153, the address resolution message is transmitted from the first device 18 to the first node 6 via the coupled connection 8.

In step 155, the first node 6 determines whether the second device 20 is an active device that is connected to the second node 10. This determination is performed by examining Table B' that is stored in the first node 6, which is the copy of the table generated by the second node 10. If the second device 20 is a device that is currently associated with a logical address, the device will be listed in Table B' with the corresponding address. If the second device 20 is not one of the devices that is currently associated with an address, it will not be listed in Table B'.

If the second device 20 is not one of the devices listed in Table B', the first node 6 returns a negative acknowledgement message, otherwise known as a nack message, to the first device 18, and does not forward the address resolution message to the second node 10 (step 157). In accordance with some protocols, such as the CEC protocol, the nack message may be the absence of a positive acknowledgement message. That is, the source of the transmission can determine that the transmission was unsuccessful if it does not receive a positive acknowledgement message.

In the following description and claims, whenever the operation of providing a negative acknowledgement is described, it should be considered as covering sending a negative acknowledgement message or failing to send a positive acknowledgement message.

If the second device 20 is listed in Table B', the first node 6 returns a positive acknowledgement message, otherwise known as an ack message, to the first device 18, and forwards the address resolution message to the second node 10 via the decoupled connection 16 (step 159).

If a device in the second set of devices 12 is to transmit an address resolution message to a device that might be connected to the first node 6, a corresponding method is used in which the second node 10 examines Table A', which is the copy of the table generated by the first node 6.

The copy tables can also be used to return nack messages when longer messages (i.e. multiple byte messages) arrive at the first or second node 6, 10 that are destined for a device that is not active or not connected to the other node.

Although it is preferred that the tables and their copies are generated as described herein, it will be appreciated that the address resolution message transmission method as shown in FIG. 3 can be implemented using tables generated by other methods.

Furthermore, although FIG. 3 illustrates a method of transmitting an address resolution message from a first device 18 to a second device 20, it will be appreciated that as a CEC connection is bi-directional, a corresponding method can be used for transmitting an address resolution message from the second device 20 to the first device 18.

As described above, if CEC data is forwarded over a decoupled connection, it is necessary to wait for the returned acknowledgement, which means that, in a conventional system, the real-time requirements of the ack/nack message cannot be met. If the complete message sent from a first device 18 to a second device 20 was captured at the first node 6, forwarded to the second node 10 via the decoupled connection 16, and reproduced at the second node 10, the message interaction between the first and second devices 18, 20 will be affected and as such the real-time behaviour of the complete system can be changed.

Figure 4:
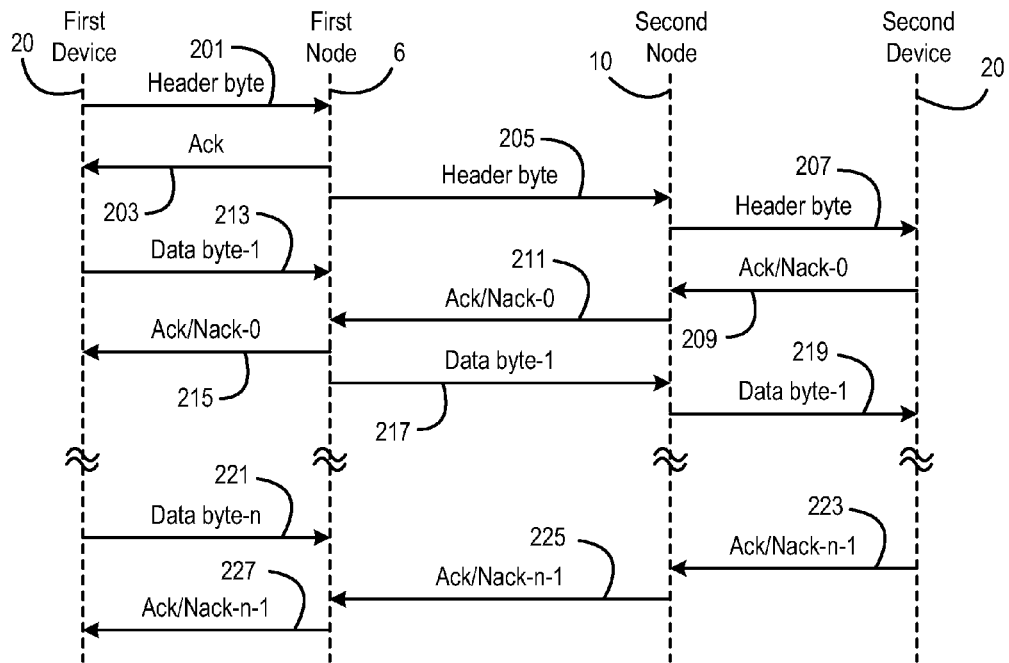
FIG. 4 is a timing diagram illustrating a method in accordance with a third aspect of the invention.

Therefore, in accordance with a third aspect of the invention, when a first device 18 is to transmit a multiple byte message comprising, for example, a header byte and N data bytes to a second node 20 in a system as shown in FIG. 1, the first node 6 returns an acknowledgement generated by the first node 6 to the first device 18 for the first byte in the message, and subsequently a feedback loop is used in which the first node 6 returns acknowledgements originating from the second device 20 for the first, second, third, etc. bytes as acknowledgements to the second, third, fourth, etc. bytes sent by the first device 6. A signalling diagram illustrating this method is shown in FIG. 4.

Although the CEC protocol transmits messages comprising a plurality of bytes of data, it will be appreciated that the method is applicable to any system which transmits multiple data packet messages.

Specifically, the first device 18 generates and sends a header byte (byte 0) of a multiple byte message comprising N data bytes to the first node 6 (step 201). In order to satisfy the timing requirements of the CEC protocol (i.e. an acknowledgment is required substantially immediately after transmission of each byte), the first node 6 returns an acknowledgment message to the first device 20 indicating successful reception of the header byte (step 203). In some embodiments, this acknowledgement can be generated using the data structures described above with reference to FIGS. 2 and 3. The first node 6 then forwards the header byte to the second node 10 via the decoupled connection 16 (step 205). On reception of the header byte, it is forwarded to the second device 20 (step 207), which generates and returns an acknowledgement or negative acknowledgement message "Ack/Nack-0" as appropriate (step 209). The "Ack/Nack-0" message for the header byte is returned to the first node 6 via the decoupled connection 16 (step 211).

After the first device 18 receives the acknowledgement message from the first node 6 for the header byte in step 203, it sends the first data byte of the multiple byte message, "Data byte-1", to the first node 6 (step 213). In order to satisfy the timing requirements of the CEC protocol, the first node 6 the "Ack/Nack-0" message to the first device 18 as an acknowledgement of "Data byte-1" (step 215).

Although FIG. 4 indicates that the first device 18 sends "Data byte-1" to the first node 6 before the first node 6 receives the "Ack/Nack-0" message from the second node 10, it will be appreciated that the "Ack/Nack-0" message must be received before reception of "Data byte-1" is completed. It will also be appreciated that the first node 6 could receive the "Ack/Nack-0" message before transmission of "Data byte-1" is completed by the first device 18, so the first node 6 must store the "Ack/Nack-0" message until it is needed. This variation in the timing of the messages could depend on the type of decoupled connection 16 used in the system 2.

"Data byte-1" is sent to the second node 10 by the first node 6 in step 217, and is forwarded by the second node 10 to the second device 20 in step 219. The acknowledgement message for "Data byte-1", "Ack/Nack-1" will then be used by the first node 6 as an acknowledgement message for "Data byte-2" when it is sent by the first device 18.

The process continues with the $n^{th}$ data byte sent by the first device 18 being acknowledged by the first node 6 using the acknowledgement message for the n-$1^{th}$ data byte generated by the second device 20, until all N data bytes in the message have been sent from the first device 18 to the second device 20. If the acknowledgement message for the $N^{th}$ data byte "Ack/Nack-N" is positive, i.e. it has been received successfully, then "Ack-N" is not required by the first node 6 and is discarded.

If the second device 20 receives any of the bytes with an error and a "Nack-n" message is returned to the first device 18, the CEC protocol allows the transmission of the complete message to be aborted and restarted, which means that the header byte is resent by the first device 18, followed by the N data bytes. Thus, in the event of a "Nack" message being returned to the first device 18, the process shown in FIG. 4 will return to step 201 and repeat.

Figure 5:
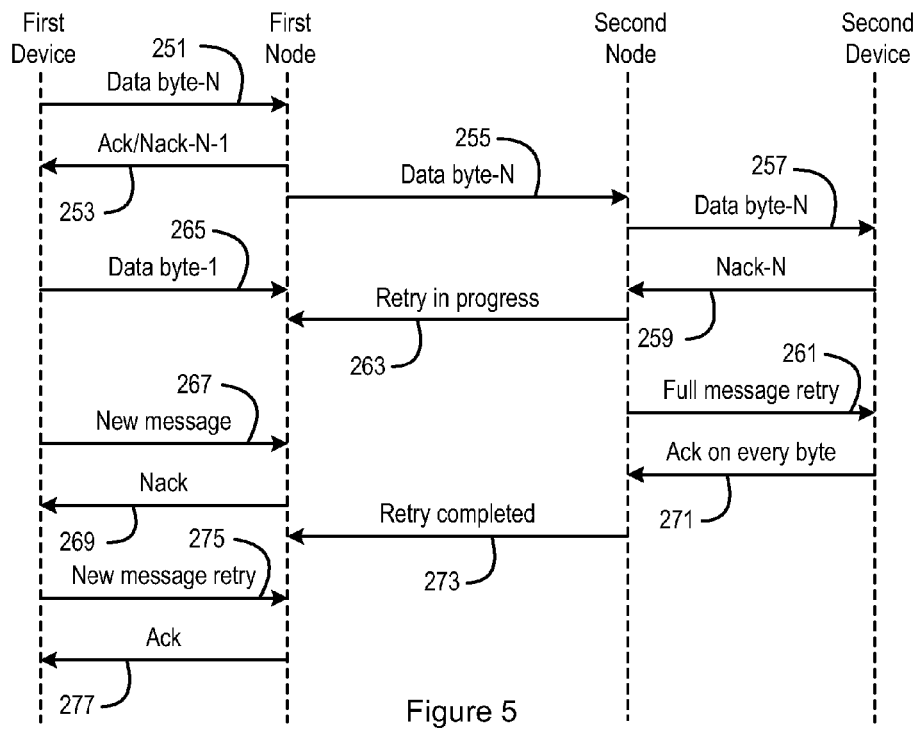
FIG. 5 is a timing diagram illustrating a further aspect of the method in accordance with the third aspect of the invention.

However, if there is an error in the last data byte of the message ("Data byte-N") at the second device 20, the feedback loop is not appropriate, as the first device 18 has already received an acknowledgement from the first node 6 for this data byte in the form of the acknowledgement for the penultimate data byte of the message ("Ack/Nack-N-1"). This is illustrated in FIG. 5.

As shown, the first device 18 transmits the last data byte of the message, "Data byte-N", to the first node 6 (step 251), and it is acknowledged using the acknowledgement message for the previous data byte, "Ack/Nack-N-1" (step 253). The last data byte of the message is transmitted to the second node 10 by the first node 6 (step 255) and then to the second device 20 (step 257).

As the second device 20 receives this last data byte with one or more errors, it returns a negative acknowledgement "Nack-N" to the second node 10 (step 259).

On receipt of this "Nack-N" message, the second node 10 must retry sending the complete N-byte message to the second device 20 (step 261). As a result, the second node 10 (and hence the first node 6 for when messages are being sent from a second device 20 to a first device 18) comprises a buffer for storing each of the bytes in the N-byte message.

Due to the timing specifications in the CEC protocol, this retransmission of the message to the second device 20 by the second node 10 can be started before a new multiple-byte message is sent from the first device 18.

The second node 10 can indicate to the first node 6 that a retry is in progress (step 263), so that if the first device 18 or another device in the first set of devices 4 transmits a data byte from a new message "Data-byte-1" (step 265) or a new message (step 267), the first node 6 can send a Nack message to the source device (step 269) or can temporarily block new data using other means known in the art.

Once the second device 20 has successfully acknowledged each of the retransmitted data bytes to the second node 10 (step 271), the second node 10 informs the first node 6 that the retry has been completed, and that further message transmissions can occur (step 273).

If the second device 20 does not successfully acknowledge each of the retransmitted data bytes to the second node 10, the retry may be repeated a finite number of times (for example five). If the transmission is still unsuccessful, the second node 10 may drop the message and inform the first node 6 that further transmissions can continue.

When the first device 18 or other device resends the first byte of the new message (step 275), the first node 6 can respond with an Ack message (step 277), and the process can proceed as shown in FIG. 4.

It will be appreciated that the method illustrated in FIG. 4 does not apply to single byte messages. However, one single-byte message in the CEC protocol is required for the address resolution mechanism, and the timing requirements of the system can then be satisfied using the methods shown in FIGS. 2 and 3.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method in a communication system, the communication system comprising a first device, a second device, a first node and a second node, the first and second nodes being connected via a decoupled connection, the method comprising:
   sending a plurality of data packets from the first device to the second device via the first and second nodes;
   on receiving a data packet from the first device, providing an acknowledgement for said data packet from the first node to the first device;
   wherein the acknowledgement provided to the first device corresponds to an acknowledgement later provided to the first node from the second device in respect of a data packet preceding said data packet.

2. A method as claimed in claim 1, further comprising:
   on receiving the first data packet in the plurality of data packets from the first device, providing an acknowledgement for said first data packet from the first node to the first device, the acknowledgement for the first data packet being generated by the first node.

3. A method as claimed in claim 1, wherein the acknowledgement can comprise a positive acknowledgement or a negative acknowledgement.

4. A method as claimed in claim 3, wherein, on receipt of a negative acknowledgement from the first node, the first device resends the plurality of data packets to the second device.

5. A method as claimed in claim 3, wherein, on receipt of a negative acknowledgement from the second device in respect of the last data packet in the plurality, the second node resends the plurality of data packets to the second device.

6. A method of address resolution performed by a first node, the first node being connected to at least a first device via a coupled connection, the first node being suitable for connection to a second node via a decoupled connection, the method comprising:
   receiving a data structure from the second node via the decoupled connection, the data structure indicating whether any of a plurality of addresses have devices associated therewith;
   receiving an address resolution message for a second device from the first device, wherein said second node being connected to at least the second device via a coupled connection;
   examining the data structure to determine whether said second device is a device that is associated with an address in said second node;
   if said second device is not a device that is associated with an address, providing a negative acknowledgement to the first device.

7. The method according to claim 6, further comprising, if the second device is a device that is associated with an address, transmitting the message to the second node via the decoupled connection.

8. The method according to claim 6, further comprising, if the second device is a device that is associated with an address, transmitting a positive acknowledgement to the first device.

9. The method according to claim 6, further comprising:
   scanning a plurality of addresses at the first node to determine if any devices in a first set of devices are associated with any of said addresses; and
   storing the result of the scanning step as a first data structure.

10. The method as claimed in claim 6, further comprising providing a copy of the first data structure to the second node via the decoupled connection.

11. The method as claimed in claim 6, wherein the scanning and storing steps are repeated periodically.

12. The method as claimed in claim 6, wherein, on receipt of information broadcast by any of said devices in the set of devices indicating an address that said device is associated therewith, the method further comprises:
   updating the stored data structure to indicate said information.

13. The method as claimed in claim 6, wherein the step of scanning comprises, for each address in the plurality of addresses, sending a polling message to a set of devices with a source and destination address that corresponds to said address in the plurality of addresses.

14. A method as claimed in claim 13, wherein it is determined that a device in the first set of devices is associated with an address in the plurality of addresses if an acknowledgement is received for a polling message containing said address.

* * * * *